Apr. 24, 1923.                                          1,452,770
B. F. WEBB
POWER TRANSMITTING MECHANISM
Filed Feb. 14, 1922

Benjamin F. Webb, INVENTOR.

BY

Geo. P. Kimmel

ATTORNEY.

Patented Apr. 24, 1923.

1,452,770

UNITED STATES PATENT OFFICE.

BENJAMIN F. WEBB, OF SISTERSVILLE, WEST VIRGINIA, ASSIGNOR OF NINE-TWENTIETHS TO ANDREW J. KARL AND ONE-EIGHTH TO FRED APPEL, BOTH OF SISTERSVILLE, WEST VIRGINIA, AND ONE-TENTH TO PAUL ENGLE AND WILLIAM H. CARTER, BOTH OF MIDDLEBOURNE, WEST VIRGINIA.

POWER-TRANSMITTING MECHANISM.

Application filed February 14, 1922. Serial No. 536,433.

*To all whom it may concern:*

Be it known that I, BENJAMIN F. WEBB, a citizen of the United States, residing at Sistersville, in the county of Tyler and State of West Virginia, have invented certain new and useful Improvements in Power-Transmitting Mechanism, of which the following is a specification.

This invention appertains to certain improvements in combined power reversing and clutch mechanisms, and has for its principal object to provide for an extremely simplified and comparatively inexpensive construction and arrangement embodying features of great durability and high efficiency in continued use and operation, and ease in care and maintenance.

Another object of the invention is to provide for a power transmitting mechanism of the class mentioned, and one designed to effect an extremely gradual pickup in speed, and embodying a means whereby to couple the driven element of the mechanism directly to the driving element thereof, when maximum speed is reached, whereby to take the wear from the means through the medium of which the gradual pickup in speed is accomplished.

A further object of the invention is to provide for a power transmission mechanism of the class mentioned, and one involving an assembly of friction elements of planetary formation and arrangement for effecting either a forward or reverse drive, and of a nature to be comparatively silent in operation, and at the same time admitting of a wide range of flexibility in control, whereby to be substantially free from any and all tendency toward jarring or jolting in the starting up, reversing or stopping operations.

With the foregoing and other objects in view, the invention resides in the certain novel and useful construction and arrangement of parts as will be hereinafter more fully described, set forth in the appended claims, and illustrated in the accompanying drawing, in which:—

Figure 1:
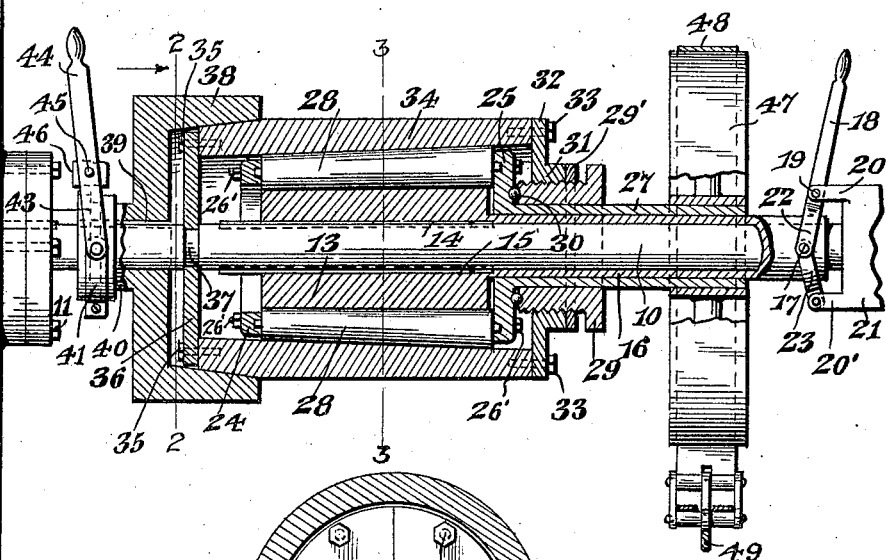
Figure 2:
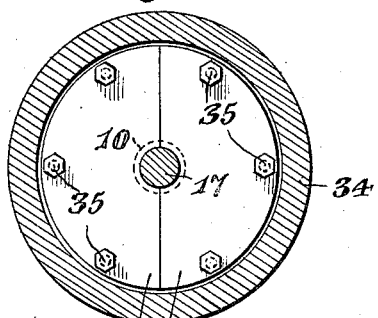
Figure 3:
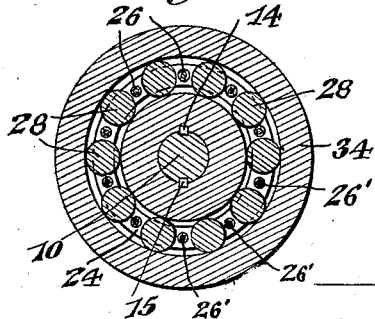
Figure 4:
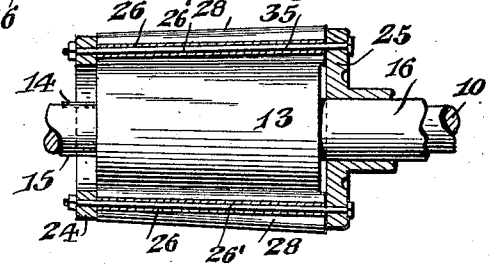

Figure 1 is a side elevation, partly in section, of a preferred embodiment of the invention, Fig. 2 is a vertical transverse section taken on the line 2—2 of Fig. 1, Fig. 3 is a similar section taken on the line 3—3 of Fig. 1, and, Fig. 4 is a fragmentary sectional view of the friction rolls for effecting the reversing of the driven element of the mechanism.

Referring to the drawing, wherein similar characters of reference designate corresponding parts throughout the several views thereof, the numeral 10 indicates a power shaft suitably coupled, or otherwise permanently secured, as by means of bolts 11, to the fly wheel 12 of an engine or the like, not shown. Mounted on the shaft 10 is a friction roll 13 which is keyed as at 14, 15, for rotation therewith, and this roll is formed at its end removed from the fly wheel 12, with an extension 16, to which is pivoted as at 17 a hand lever 18, whereby the roll 13 may be slid along the shaft 10 for the purposes to be hereinafter more fully explained. The hand lever 18 is pivoted as at 19 in a bifurcated projection 20, formed on a stationary member or collar 21, surrounding the shaft 10, and has its lower end formed to provide a yoke portion 22 engaging around the sleeve extension 16 and connecting the pivot 17, while a second yoke portion 23 is engaged around the extension 16 at the side thereof opposite to that engaged by the lever yoke 22, and has a lug formed medially of its oppositely curved ends which is pivotally engaged in a second bifurcated projection 20' formed with the member or collar 21 at a point thereon diametrically opposite to the bifurcated projection 20. Mounted on the extension 16, and enclosing the friction roll 13, is a carrier or cage formed of an inner annular member or ring 24, and an outer member or apertured plate 25, which are spaced apart for the required distance by means of a series of equidistantly spaced sleeves 26, and secured together by a number of bolts 26' passing through said sleeves for the purpose. The plate is mounted on the extension 16 and 25 is of circular formation and has projecting therefrom a sleeve 27 fitted on the extension 16. Spaced between the rods or bolts 26' are a plurality of friction rollers 28, which are journalled at their opposite ends in the members 24 and 25. Fitted on the sleeve 27 is a bushing 29, having its inner end formed to provide an annular groove complemental to an annular groove in the opposed wall of the plate 25, whereby to form a raceway for the reception of a circular series of ball bearings 30. The outer surface of the bushing 29 is screw threaded to receive thereon the sleeve portion 31 of a circular plate 32, which is bolted as at 33 to the abutting end of a pulley or other similar power driven element 34, the latter being of cylindrical form and fitting over and enclosing the roll 13, together with the cage in which the circular series of friction rollers 28, are carried. The opposite end of the element or pulley 34 is bolted as at 35 to a circular plate 36, formed of two portions having circular recesses at the center of their abutting edges to engage around and seat in an annular groove 37 formed in the shaft 10. To compensate for any and all wear and tear on the friction roll 13 and the rollers 28, the bushing 29 may be adjusted inwardly of the plate 32 and secured in position by the screwing up of a lock nut 29' thereon, and into abutting relation with respect to the opposed end of the flanged portion 31, of the plate 32, through which the bushing 29 is threaded.

The peripheral surface of the friction roll 13 is tapered from one end to the other and preferably in the direction of the end thereof opposed to the fly wheel 12, and similarly the friction rolls 28 are also tapered, while the wall of the bore of the element or pulley 34 is tapered in the reverse direction with respect to both the roll 13 and the friction rolls 28.

The inner end of the outer peripheral surface of the element or pulley 34 is tapered to have co-operative therewith the complementally tapered inner periphery of the flanged portion 38 of a clutch element or member 38', which is slidably secured to the shaft 10 by means of a key 39. The clutch element or member 38 is formed to provide a hub extension 40 having an annular groove therein for the reception of a split yoke 41 to which is pivoted, as at 42, the forked or yoked end 43 of a hand lever 44, the latter being pivoted at an intermediate point, as at 45, to a bracket 46. Mounted on the free end of the sleeve 27 and keyed thereto, is a drum 47 which is encircled by a brake band 48 arranged to be tightened or loosened thereon by means of a hand lever or the like 49.

In the operation of the mechanism as thus constructed and arranged, initial starting movement of the driven element or pulley 34 will be imparted thereto by the manipulation of the hand lever 18, the same being moved in the direction to gradually force the tapered roll 13 into engagement with the tapered rolls 28, when the frictional contact therebetween will start the rotation of the pulley 34 and the speed of the same will increase correspondingly with the increase of such frictional contact or engagement. When the pulley 34 is being driven at full load or speed, it is desirable to take the wear and tear from the friction rolls 13 and 28, and for this purpose, the lever 44 will be manipulated to throw the clutch 38 into engagement with the tapered end of the pulley 34, when the latter will be coupled directly with the shaft 10, so that the lever 18 can now be moved back to its original position to withdraw the roll 13 from frictional contact with the rolls 28.

To now effect the reversing of the direction of rotation of the pulley 34, the clutch 38 will be disengaged from pulley 34, and, with the roll 13 still in frictional engagement with the frictional rollers 28 by the proper operation of the hand lever 18, the brake lever 49 will be manipulated to tighten the brake band 48 on the drum 47, when the cage, formed by the ring 24 and the plate 25, will be held against rotation, and the roll 13 will frictionally drive the rolls 28 in a direction reverse to that of itself or the shaft 10, and consequently this reversed rotation of the rolls 28 will be imparted to the pulley 34.

The foregoing mechanism constitutes an improvement over the similar mechanisms as set forth in my copending applications filed June 29, 1921, Serial No. 481,336, and August 27, 1921, Serial No. 493,034, in that I have provided therein no means for the direct rotation of the power element or pulley from the power or driving shaft, whereby to relieve the friction rollers from all wear and tear incident to carrying the full load being driven from the power element or pulley, nor any means whereby to effect a relative movement between the center roll and the friction rolls interposed between the latter and the power element or pulley.

In view of the foregoing, it is to be understood that while a preferred embodiment of the mechanism has been described and illustrated herein in specific terms and details of construction, arrangement and operation, various changes in and modifications of the same may be resorted to without departing from the spirit of the invention, or the scope of the claims appended hereto.

Having thus described the invention, what is claimed as new, is:—

1. In a power transmission mechanism, a power shaft, a driven element loosely mounted on said power shaft, friction means including a longitudinally shiftable element operating with the drive shaft and a support provided with a plurality of driving elements operated from said shiftable element for connecting said driven element with said power shaft for rotation in the same direction therewith, means effecting a braking action on said support to arrest movement thereof whereby said driving elements will cause a reversed direction of rotation to said driven element, and means for connecting said driven element to said power shaft for rotation in the same direction therewith whereby said first mentioned means may be rendered inoperative.

2. In a power transmission mechanism, a power shaft, a driven element loosely mounted on said power shaft, friction means including a longitudinally shiftable element operating with the drive shaft and a support provided with a plurality of driving elements operated from said shiftable element for connecting said driven element with said power shaft for rotation in the same direction therewith, means for effecting a braking action on said support to arrest movement thereof whereby said driving elements will cause a reversed direction of rotation to said driven element, and a friction clutch member keyed directly to said power shaft for connecting said driven element thereto for rotation in the same direction therewith and whereby said first mentioned means may be rendered inoperative.

3. In a power transmission mechanism, a power shaft, a pulley loosely mounted on said power shaft, friction clutch means for connecting said pulley to said power shaft for rotation in the same direction therewith and including as a part thereof a shiftable support, means for actuating said friction clutch means into and out of engagement with said pulley, means for effecting a braking action on said support of said clutch means to arrest movement of said support whereby to effect a reversed direction of rotation to said pulley, and a friction clutch member keyed directly to said power shaft for connecting said pulley thereto for rotation in the same direction therewith and whereby said first mentioned clutch means may be rendered inoperative.

4. In a power transmission mechanism, a power shaft, a friction cone slidably keyed to said shaft, a pulley loosely mounted on said power shaft and having a tapered bore enclosing said friction cone, tapered friction rollers interposed between the opposed tapered surfaces of said friction cone and pulley, a cage for supporting said friction rollers in position and journalled for normally free rotation on said power shaft, means for shifting said cone relative to said tapered rollers for connecting and disconnecting said pulley from said shaft, means for effecting a braking action on said cage whereby said tapered rollers are driven from said cone in a direction reversed to the rotation thereof and to that of the power shaft, and, in turn, drive the pulley in said reversed direction, and a friction clutch directly keyed to said power shaft and operable to connect said pulley to the latter in its forward direction of rotation, whereby said cone and tapered rollers may be rendered inoperative.

In testimony whereof, I affix my signature hereto.

BENJAMIN F. WEBB.